United States Patent
Zhang et al.

(10) Patent No.: US 10,551,687 B2
(45) Date of Patent: Feb. 4, 2020

(54) LIQUID CRYSTAL GRATING, DISPLAY DEVICE AND DISPLAY METHOD

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Guiyu Zhang, Beijing (CN); Ming Hu, Beijing (CN); Ming Zhang, Beijing (CN); Zouming Xu, Beijing (CN); Qitao Zheng, Beijing (CN); Shifeng Xu, Beijing (CN); Jing Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/744,936

(22) PCT Filed: Aug. 1, 2017

(86) PCT No.: PCT/CN2017/095454
§ 371 (c)(1),
(2) Date: Jan. 15, 2018

(87) PCT Pub. No.: WO2018/126668
PCT Pub. Date: Jul. 12, 2018

(65) Prior Publication Data
US 2019/0011740 A1    Jan. 10, 2019

(30) Foreign Application Priority Data
Jan. 4, 2017    (CN) .......................... 2017 1 0004509

(51) Int. Cl.
*G02F 1/1343*    (2006.01)
*G02F 1/1335*    (2006.01)
(Continued)

(52) U.S. Cl.
CPC ........ *G02F 1/1343* (2013.01); *G02F 1/13306* (2013.01); *G02F 1/133512* (2013.01);
(Continued)

(58) Field of Classification Search
CPC ........... G02F 1/134309; G02F 1/13439; G02F 1/1343; G02F 1/1313; G02F 1/13306;
(Continued)

(56) References Cited

U.S. PATENT DOCUMENTS

| 6,172,792 B1 | 1/2001 | Jepsen et al. |
| 2012/0194510 A1* | 8/2012 | Yun .......................... G02B 3/06 345/419 |

(Continued)

FOREIGN PATENT DOCUMENTS

| CN | 202306062 U | 7/2012 |
| CN | 202486462 U | 10/2012 |

(Continued)

OTHER PUBLICATIONS

International Search Report and Written Opinion for International Application No. PCT/CN2017/095454, dated Oct. 25, 2017, 10 pages.

(Continued)

*Primary Examiner* — Thoi V Duong
(74) *Attorney, Agent, or Firm* — Westman, Champlin & Koehler, P.A.

(57) ABSTRACT

The present disclosure provides a liquid crystal grating, a display device and a display method. The liquid crystal grating includes a first electrode arranged on a first substrate and a second electrode arranged on a second substrate. The (Continued)

first electrode includes at least two sub-electrode layers. Each sub-electrode layer includes a plurality of sub-electrodes spaced apart from, and arranged parallel to, each other. A gap between every two adjacent sub-electrodes of one sub-electrode layer is capable of being covered by projections of the sub-electrodes of the other sub-electrode layer onto the one sub-electrode layer.

12 Claims, 3 Drawing Sheets

(51) Int. Cl.
    *G02F 1/1333*     (2006.01)
    *H04N 13/366*     (2018.01)
    *G02F 1/1362*     (2006.01)
    *G02F 1/133*     (2006.01)

(52) U.S. Cl.
    CPC .. *G02F 1/134309* (2013.01); *G02F 1/136209* (2013.01); *H04N 13/366* (2018.05)

(58) Field of Classification Search
    CPC ............ G02F 1/1333; G02F 1/133512; G02F 1/134336; G02F 1/13; G02F 1/133; G02F 1/133345; G02F 2201/30; G02F 2201/305
    See application file for complete search history.

(56) References Cited

U.S. PATENT DOCUMENTS

| | | | | |
|---|---|---|---|---|
| 2014/0362314 A1* | 12/2014 | Guo | ................... | G02B 27/2214 349/15 |
| 2015/0042938 A1* | 2/2015 | Shi | ................... | G02F 1/134309 349/138 |
| 2016/0070111 A1 | 3/2016 | Takama et al. | | |

FOREIGN PATENT DOCUMENTS

| | | | |
|---|---|---|---|
| CN | 103278973 | A | 9/2013 |
| CN | 103995402 | A | 8/2014 |
| CN | 103995403 | A | 8/2014 |

OTHER PUBLICATIONS

English translation of Written Opinion for International Application No. PCT/CN2017/095454, dated Oct. 25, 2017, 2 pages.

First Office Action, including Search Report, for Chinese Patent Application No. 201710004509.7, dated Mar. 1, 2019, 17 pages.

* cited by examiner ued States Patent

LIQUID CRYSTAL GRATING, DISPLAY DEVICE AND DISPLAY METHOD

CROSS-REFERENCE TO RELATED APPLICATION

This application is the U.S. national phase of PCT Application No. PCT/CN2017/095454 filed on Aug. 1, 2017, which claims a priority of the Chinese Patent Application No. 201710004509.7 filed on Jan. 4, 2017, the disclosures of which are incorporated in their entirety by reference herein.

TECHNICAL FIELD

The present disclosure relates to the field of display technology, in particular to a liquid crystal grating, a display device and a display method.

BACKGROUND

Along with the rise of information society, there is an increasing demand on various display devices. Usually, an image is displayed by a display device in a two-dimensional (2D) manner, so it is impossible to show depth information of a scenario intuitively. Along with the development of the computer information technology and the display technology, a three-dimensional (3D) display technology has become a research focus in the display field, and its operating principle will be described as follows. With respect to an identical scenario, different images are viewed by a left eye and a right eye of a viewer. Due to an interpupillary distance, two images slightly different from each other may be displayed on retinas of the left and right eyes of the viewer. This phenomenon is called as "binocular parallax", and the two images form a "stereo image pair". Then, the stereo image pair is combined in a brain's visual cortex, so as to provide a stereo display effect.

SUMMARY

An object of the present disclosure is to provide a liquid crystal grating, a display device and a display method, so as to solve the problem in the related art where the attachment accuracy for attaching the conventional liquid crystal grating onto the 2D display device is highly demanded, and a bad 3D display effect is provided due to the constant and small visual range of the liquid crystal grating.

In one aspect, the present disclosure provides in some embodiments a liquid crystal grating, including a first substrate, a second substrate arranged opposite to the first substrate, and a liquid crystal layer arranged between the first substrate and the second substrate. The liquid crystal grating further includes a first electrode arranged on the first substrate and a second electrode arranged on the second substrate. Liquid crystals in the liquid crystal layer are capable of being deflected under the effect of an electric field generated between the first electrode and the second electrode. The first electrode includes at least two sub-electrode layers insulated from each other. Each sub-electrode layer includes a plurality of sub-electrodes spaced apart from, and arranged parallel to, each other. The sub-electrodes at different layers extend in an identical direction. A gap between every two adjacent sub-electrodes at one of the sub-electrode layers is capable of being covered by projections of the sub-electrodes at the other sub-electrode layers onto the one sub-electrode layer.

In another aspect, the present disclosure provides in some embodiments a display device, including a liquid crystal grating. The liquid crystal grating includes a first substrate, a second substrate arranged opposite to the first substrate, and a liquid crystal layer arranged between the first substrate and the second substrate. The liquid crystal grating further includes a first electrode arranged on the first substrate and a second electrode arranged on the second substrate. Liquid crystals in the liquid crystal layer are capable of being deflected under the effect of an electric field generated between the first electrode and the second electrode. The first electrode includes at least two sub-electrode layers insulated from each other. Each sub-electrode layer includes a plurality of sub-electrodes spaced apart from, and arranged parallel to, each other. The sub-electrodes at different layers extend in an identical direction. A gap between every two adjacent sub-electrodes at one of the sub-electrode layers is capable of being covered by projections of the sub-electrodes at the other sub-electrode layers onto the one sub-electrode layer.

In yet another aspect, the present disclosure provides in some embodiments a display method for the above-mentioned display device, including steps of: acquiring a position of a user; calculating a position of a light-shielding pattern of a liquid crystal grating in accordance with the position of the user; determining a sub-electrode of a first electrode to be energized in accordance with the position of the light-shielding pattern of the liquid crystal grating; and energizing the sub-electrode of the first electrode.

According to the liquid crystal grating, the display device and the display method in the embodiments of the present disclosure, the liquid crystal grating includes the first substrate, the second substrate arranged opposite to the first substrate, and the liquid crystal layer arranged between the first substrate and the second substrate. The liquid crystal grating further includes the first electrode arranged on the first substrate and the second electrode arranged on the second substrate. The liquid crystals in the liquid crystal layer are capable of being deflected under the effect of the electric field generated between the first electrode and the second electrode. The first electrode includes at least two sub-electrode layers insulated from each other. Each sub-electrode layer includes the plurality of sub-electrodes spaced apart from, and arranged parallel to, each other. The sub-electrodes at different layers extend in an identical direction. The gap between every two adjacent sub-electrodes at one of the sub-electrode layers is capable of being covered by projections of the sub-electrodes at the other sub-electrode layers onto the one sub-electrode layer. In this way, the electrode at one side of the liquid crystal grating includes a plurality of sub-electrode layers, and each sub-electrode layer includes a plurality of sub-electrodes arranged parallel to each other, so as to reduce the requirement on the attachment accuracy. In addition, the sub-electrode layers cooperate with each other, so as to adjust the position of the light-shielding pattern of the liquid crystal grating, thereby to adjust and enlarge a 3D display region at any time.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
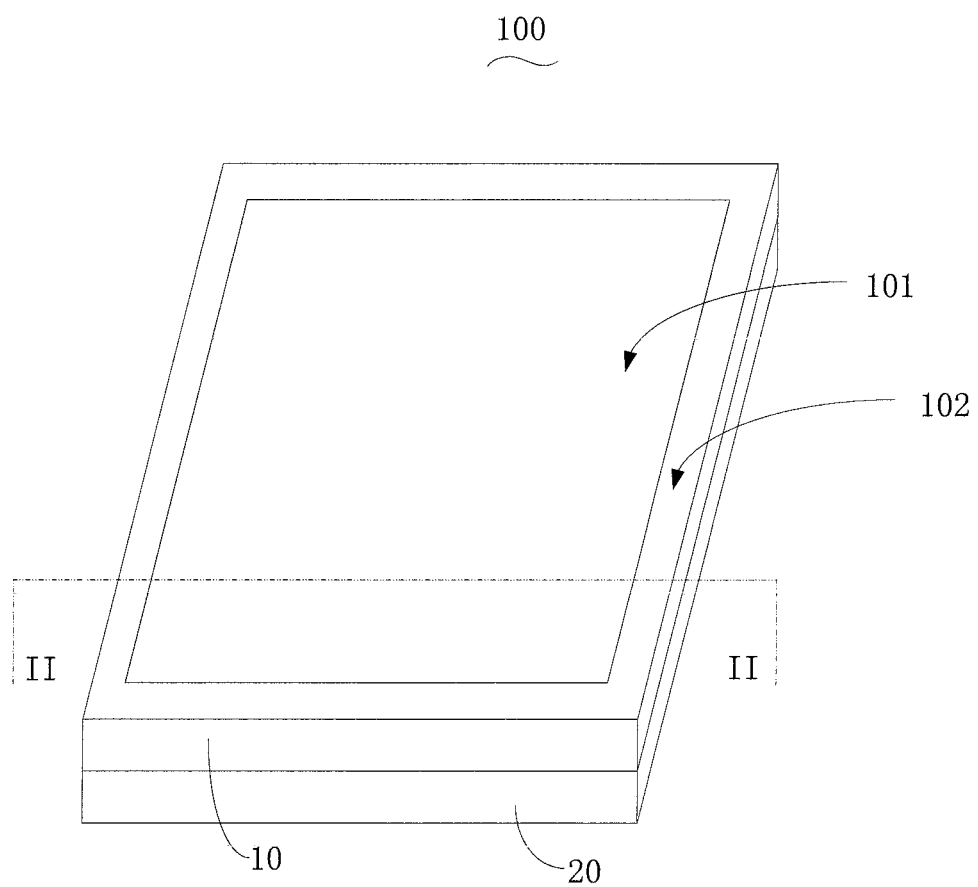
FIG. 1 is a solid view of a display device according to one embodiment of the present disclosure.

As shown in FIG. 1, the present disclosure provides in some embodiments a display device 100, which includes a liquid crystal grating 10 and a display module 20. The liquid crystal grating 10 is arranged on the display module 20. The display device 100 further includes a display region 101 and a peripheral region surrounding the display region 101. The display region 101 is configured to achieve a display function of the display device. In addition, due to the liquid crystal grating 10, it is able for the display device 100 to provide a 3D display effect.

Figure 2:
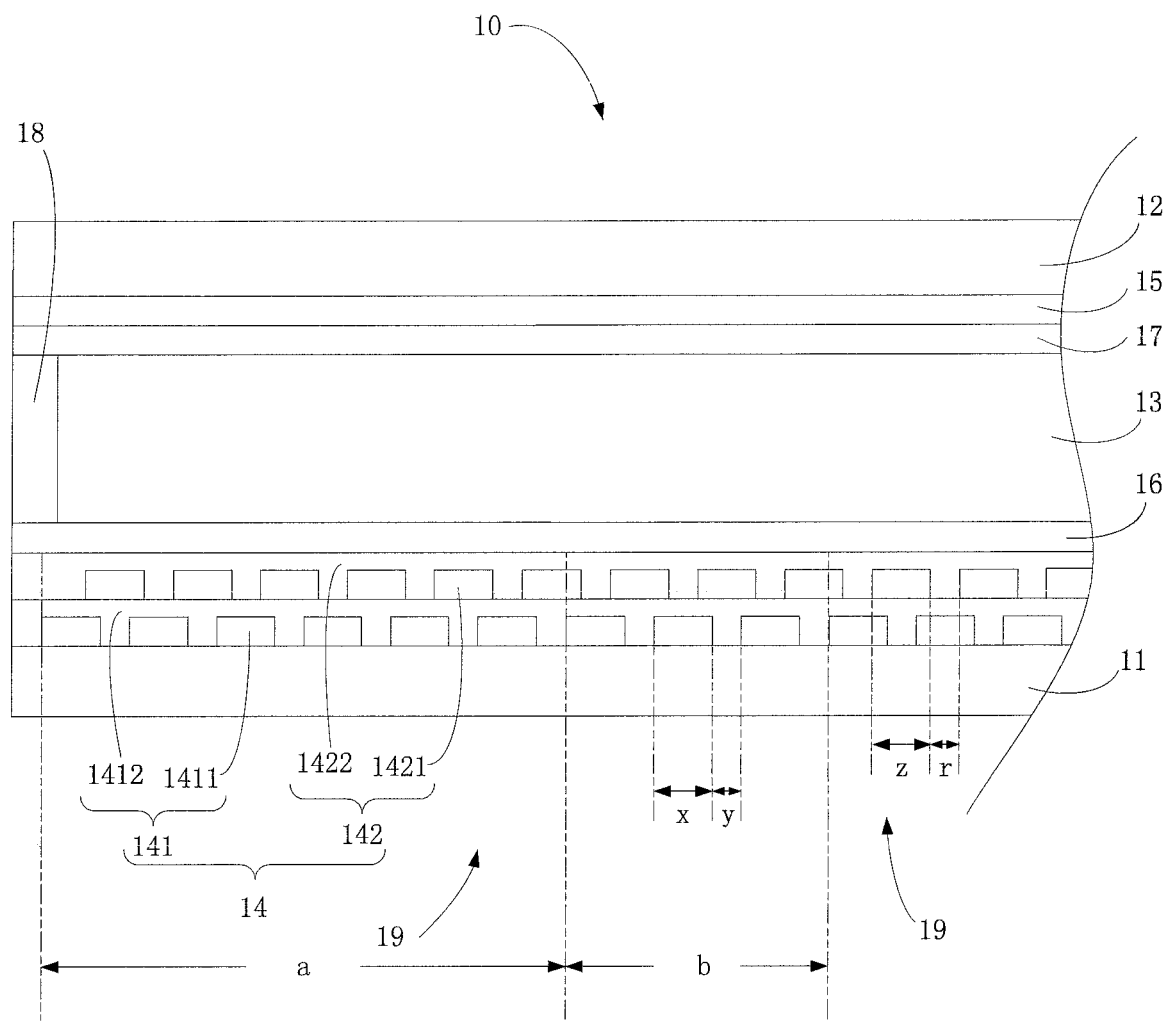
FIG. 2 is a sectional view of a liquid crystal grating along line II-II in FIG. 1.

As shown in FIG. 2, which is a sectional view of the liquid crystal grating 10 along line II-II in FIG. 1, the liquid crystal grating 10 includes a first substrate 11, a second substrate 12, a liquid crystal layer 13, a first electrode 14, a second electrode 15, a first alignment film 16, a second alignment film 17 and a sealant 18. The first substrate 11 is arranged opposite to the second substrate 12. The liquid crystal layer 13 is arranged between the first substrate 11 and the second substrate 12, and accommodated within a cavity defined by the first substrate 11, the second substrate 12 and the sealant 18. Liquid crystals in the liquid crystal layer 13 are capable of being deflected under the effect of an electric field generated between the first electrode 14 and the second electrode 15. The sealant 18 is arranged between the first substrate 11 and the second substrate 12, and at the peripheral region 102 of the display device 100. The sealant 18 forms the cavity with the first substrate 11 and the second substrate 12, so as to accommodate the liquid crystal layer 13.

The first electrode 14 is arranged on the first substrate 11 and at a side of the first substrate 11 adjacent to the liquid crystal layer. The first alignment film 16 is arranged on the first substrate 11 and at a side of the first electrode 14 adjacent to the liquid crystal layer 13. The second electrode 15 is arranged on the second substrate 12, and at a side of the second substrate 12 adjacent to the liquid crystal layer 13. The second alignment film 17 is arranged on the second substrate 12, and at a side of the second electrode adjacent to the liquid crystal layer 13.

The first electrode 14 includes a first sub-electrode layer 141 and a second sub-electrode layer 142. The first sub-electrode layer 141 is arranged between the second sub-electrode layer 142 and the first substrate 11, and the second sub-electrode layer 142 is arranged between the first sub-electrode layer 141 and the first alignment film 16. The first sub-electrode layer 141 is insulated from the second sub-electrode layer 142.

The first sub-electrode layer 141 includes a plurality of first sub-electrodes 1411 and a first protection layer 1412. The first sub-electrodes 1411 are spaced apart from each other at an identical interval, and arranged parallel to each other. The plurality of first sub-electrodes 1411 is arranged between the first protection layer 1412 and the first substrate. The first protection layer 1412 covers the plurality of first sub-electrodes 1411 and fills up a gap between any two adjacent first sub-electrodes 1411, so as to enable any two adjacent first sub-electrodes 1411 to be insulated from each other.

The second sub-electrode layer 142 includes a plurality of second sub-electrodes 1421 and a second protection layer 1422. The second sub-electrodes 1421 are spaced apart from each other at an identical interval, and arranged parallel to each other. The plurality of second sub-electrodes 1421 is arranged between the first protection layer 1412 and the second protection layer 1422. The second protection layer 1422 is arranged at a side of the first alignment film 16 away from the liquid crystal layer 13. The second protection layer 1422 covers the plurality of second sub-electrodes 1421 and fills up a gap between any two adjacent second sub-electrodes 1421, so as to enable any two adjacent second sub-electrodes 1421 to be insulated from each other.

The first sub-electrodes 1411 and the second sub-electrodes 1421 at different layers are arranged alternately in such a manner that a projection of each second sub-electrode 1421 onto the first sub-electrode layer 141 in a direction perpendicular to the first substrate 11 covers a gap between the corresponding two adjacent first sub-electrodes 1411. In a possible embodiment of the present disclosure, in order to achieve a better effect, the projection of each second sub-electrode 1421 onto the first sub-electrode layer 141 partially overlaps the corresponding first sub-electrode 1411.

Each first sub-electrode 1411 of the first sub-electrode layer 141 may form a light-shielding pattern 19 with the corresponding second sub-electrode 1421 of the second sub-electrode layer 142, and the plurality of light-shielding patterns 19 may be spaced apart from, and arranged parallel to, each other.

In a conventional liquid crystal grating, each light-shielding pattern is a complete electrode pattern. After the manufacture of the liquid crystal grating, a position of each light-shielding pattern is constant. In the case of attaching the liquid crystal grating onto the display module, the attachment accuracy is highly demanded. In addition, due to the constant position of each light-shielding pattern, a visual range of the liquid crystal grating is also constant. At this time, a better 3D display effect may be provided merely at a region directly in front of the display device. In the case that a viewer is located at an edge of the display device, a bad 3D display effect may be provided, i.e., light beams from right-eye and left-eye images may be confused, and the right-eye and left-eye images may superimpose each other.

According to the embodiments of the present disclosure, the electrode pattern in the conventional liquid crystal grating may be divided into several portions, and these portions may cooperate with each other, so as to form the complete light-shielding pattern.

In a possible embodiment of the present disclosure, each light-shielding pattern 19 consists of a plurality of adjacent and consecutive first sub-electrodes 1411 and a plurality of adjacent and consecutive second sub-electrodes 1421 corresponding to the first sub-electrodes 1411.

In the case that each light-shielding pattern 19 has a width of a, an interval between every two adjacent light-shielding patterns 19 is b, each first sub-electrode 1411 has a width of x and an interval between every two adjacent first sub-electrodes 1411 is y, a relationship between the width of the first sub-electrode 1411 and the width of the light-shielding pattern 19 may meet the equation a=n*x (where n is an integer greater than 1), and a relationship between the interval between every two adjacent first sub-electrodes 1411 and the interval between every two adjacent light-shielding patterns 19 may meet the equation b=n*y (where n is an integer greater than 1).

Here, in order to adjust the width of each light-shielding pattern 19 more easily and accurately, thereby to adjust the position of each light-shielding pattern of the liquid crystal grating and adjust the 3D display region at any time, in a possible embodiment of the present disclosure, a ratio of the width x of each first sub-electrode 1411 to the interval y between every two adjacent first sub-electrodes 1411 is a ratio of two natural numbers. In another embodiment of the present disclosure, x is an integral multiple of y, or y is an integral multiple of x. In some other embodiments of the present disclosure, x may be equal to y.

In the case that each second sub-electrode 1421 has a width of z and an interval between every two adjacent second sub-electrodes 1421 is r, a relationship between the width of each second sub-electrode 1421 and the width of each light-shielding pattern 19 may meet the equation: a=m*z (where m is an integer greater than 1), and a relationship between the interval between every two adjacent second sub-electrodes 1421 and the interval between every two adjacent light-shielding patterns 19 may meet the equation: b=m*r (where m is an integer greater than 1).

Similarly, a ratio of the width z of each second sub-electrode 1421 to the interval r between every two adjacent second sub-electrodes 1421 is a ratio of two natural numbers. In a possible embodiment of the present disclosure, z is an integral multiple of r or r is an integral multiple of z. In some other embodiments of the present disclosure, r may be equal to z.

In the embodiments of the present disclosure, each electrode pattern and the gap between the every two adjacent electrode patterns are divided to portions at an identical number. Of course, each electrode pattern may be divided into portions at a number different from the gap between every two adjacent electrode patterns, which will not be particularly defined herein.

In this way, it is able to combine, from any position, the plurality of consecutive first sub-electrodes 1411 and the plurality of second sub-electrodes 1421, so as to calculate the intervals between each light-shielding pattern 19 and the adjacent two light-shielding patterns 19.

Values of n and m may be set in accordance with the adjustment accuracy of the liquid crystal grating, or in accordance with a manufacture process, which will not be particularly defined herein.

To be specific, during the operation of the liquid crystal grating 10, a first electrode block consisting of consecutively adjacent k1 first sub-electrodes 1411 of the first sub-electrode layer 141 may be energized, and k1*x+k1*y=a, where k1 is an integer greater than 1. Meanwhile, a second electrode block consisting of consecutively adjacent k2 second sub-electrodes 1421 of the second sub-electrode layer 142 may be energized, and k2*z+k2*r=a, where k2 is an integer greater than 1. In this way, it is able to acquire the light-shielding pattern 19 of the liquid crystal grating 10. In other words, the first electrode block and the second electrode block together form the light-shielding pattern 19.

In the case that the first electrode block and the second electrode block are energized simultaneously, it is necessary to ensure that a first one of the second sub-electrodes 1421 of the second electrode block which is energized just corresponds to a first one and a second one of the first sub-electrodes 1411 of the first electrode block which are energized. In other words, a projection of the first one of the second sub-electrodes 1421 of the second electrode block which is energized onto the first sub-electrode layer 141 covers the first one and the second one of the first sub-electrodes 1411 of the first electrode block which are energized.

After the first one of the first electrode blocks and the first one of the second electrode blocks are energized, an interval between every two adjacent first electrode blocks may be set as b, and an interval between every two adjacent second electrode blocks may be set as b too. In this way, it is able to acquire the liquid crystal grating 10 consisting of the light-shielding pattern 19 having the width of a and two adjacent light-shielding patterns 19 spaced apart from each other at an interval of b.

To be specific, after the first electrode block consisting of consecutively adjacent k1 first sub-electrodes 1411 of the first sub-electrode layer 141 have been energized, the subsequent consecutive f1 first sub-electrodes 1411 may not be energized, and f1*x+f1*y=b (where f1 is an integer greater than 1). Meanwhile, after the second electrode block consisting of consecutively adjacent k2 second sub-electrodes 1421 of the second sub-electrode layer 142 have been energized, the subsequent consecutive f2 second sub-electrodes 1421 may not be energized, and f2*z+f2*r=b, where f2 is an integer greater than 1. In this way, it is able to acquire an interval between every two adjacent light-shielding patterns 19 of the liquid crystal grating 10.

For example, the first electrode block consisting of consecutively adjacent 6 first sub-electrodes 1411 and the second electrode block consisting of consecutively adjacent 6 second sub-electrodes 1421 may form a light-shielding pattern 19. Next, the subsequent consecutive 3 first sub-electrodes 1411 and the corresponding consecutive 3 second sub-electrodes 1421 may form a gap between every two adjacent light-shielding patterns 19. Next, the first electrode block consisting of subsequent consecutive 6 first sub-electrodes 1411 and the second electrode block consisting of subsequent consecutive 6 second sub-electrodes 1421 may form another light-shielding pattern 19. Next, the subsequent consecutive 3 first sub-electrodes 1411 and the corresponding consecutive 3 second sub-electrodes 1421 may form another gap between every two adjacent light-shielding patterns 19. This procedure may be repeated, so as to form the light-shielding patterns of the liquid crystal grating spaced apart from each other and determine the gap between the light-shielding patterns. The above description is merely for illustrative purposes, and each light-shielding pattern and the gap between the light-shielding patterns may consist of the first sub-electrodes and the second sub-electrodes at any number.

In the embodiments of the present disclosure, the first electrode includes the first sub-electrode layer and the second sub-electrode layer. However, in some other embodiments of the present disclosure, the first electrode may further include a third sub-electrode layer, a fourth sub-electrode layer and the like. In other words, the first electrode needs to include at least two sub-electrode layers. In the case that the first electrode includes a plurality of sub-electrode layers (two or more sub-electrode layers), each sub-electrode may include a plurality of sub-electrodes spaced apart from, and arranged parallel to, each other, and the sub-electrodes at different layers may extend in an identical direction. In order to achieve the technical effect as mentioned in the above embodiments, it is merely necessary to ensure that the gap between every two adjacent sub-electrodes of one of the sub-electrode layers is capable of being covered by the projections of the sub-electrodes of the other sub-electrode layers onto the one sub-electrode layer, that the width of the electrode block consisting of the consecutively adjacent sub-electrodes of each sub-electrode layer is identical to the width of the light-shielding pattern of the liquid crystal grating, and that the electrode blocks at each layer together form the light-shielding pattern.

In this regard, in the case that the liquid crystal grating 10 is not energized, liquid crystal molecules between the first electrode 14 and the second electrode 15 may not be deflected, and at this time the liquid crystal grating 10 may be in a normally-white state and the display device 100 is capable of providing a 2D display effect. In the case that the liquid crystal grating 10 is energized, the liquid crystal molecules between the second electrode 15 and the light-shielding pattern 19 formed by the first electrode block and the second electrode block may be deflected so as to not allow light beams pass therethrough, and the liquid crystal molecules between the second electrode 15 and the gap between the two adjacent light-shielding patterns 19 may not be defected so as to allow the light beams to pass therethrough. At this time, it is able for the liquid crystal grating 10 to provide alternately bright and dark stripes, thereby to enable the display device 100 to provide a 3D display effect.

According to the liquid crystal grating and the display device in the embodiments of the present disclosure, the electrode at one side of the liquid crystal grating includes a plurality of electrode layers, and each electrode layer includes a plurality of sub-electrodes arranged parallel to each other. As a result, it is able to reduce the requirement on the attachment accuracy. In addition, the electrode layers may cooperate with each other, so as to adjust the position of each light-shielding pattern of the liquid crystal grating, thereby to adjust and enlarge the 3D display region.

Figure 3:
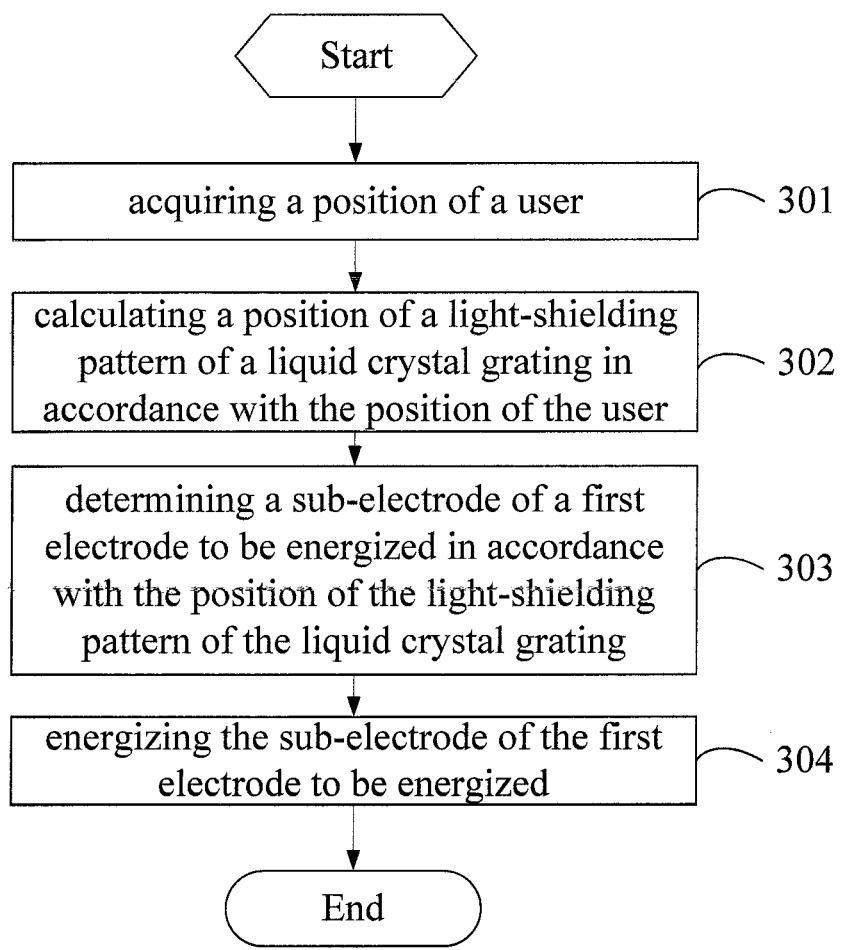
FIG. 3 is a flow chart of a display method according to one embodiment of the present disclosure.

Correspondingly, the present disclosure further provides in some embodiments a display method for the above-mentioned display device 100. As shown in FIG. 3, the display method may include the following steps.

Step 301: acquiring a position of a user. To be specific, an image in front of the display device may be acquired through a camera on the display device, and then the position of the user or a line-of-sight direction of the user may be acquired in accordance with the image. In addition, the image in front of the display device, positions of eyes of the user or the line-of-sight direction of the user may also be acquired through another device, e.g., a Charge Coupled Device (CCD) image sensor, so as to determine a viewing position of the user.

Step 302: calculating a position of a light-shielding pattern of a liquid crystal grating in accordance with the position of the user. In this step, after the position of the user has been acquired, a region where an optimum 3D display effect is to be acquired may be calculated in accordance with the position of the user, and then the position of the light-shielding pattern of the liquid crystal grating may be calculated in accordance with the region where the optimum 3D display effect is to be acquired. Here, a known space geometric calculation method may be adopted, and thus will not be particularly defined herein.

Step 303: determining a sub-electrode of a first electrode to be energized in accordance with the position of the light-shielding pattern of the liquid crystal grating. In this step, after the position of the light-shielding pattern has been determined, the display device may determine the sub-electrodes of the first electrode to be energized, i.e., a first sub-electrode and a second sub-electrode that form the light-shielding pattern, in accordance with the position of the light-shielding pattern.

Step 304: energizing the sub-electrode of the first electrode. In this step, after the sub-electrode of the first electrode to be energized has been determined, the display device may energize the sub-electrode, so as to form the alternately bright and dark stripes, thereby to achieve the 3D display effect.

According to the display method in the embodiments of the present disclosure, the position of the user is acquired, the position of the light-shielding pattern of the liquid crystal grating is calculated in accordance with the position of the user, the sub-electrode of the first electrode to be energized is determined in accordance with the position of the light-shielding pattern of the liquid crystal grating, and then the sub-electrode of the first electrode is energized. The position of the light-shielding pattern of the liquid crystal grating is adjusted through acquiring the position of the user, so that the user is always located at the region where the optimum 3D display effect is to be acquired. In this way, no matter whether the user is just located in front of the display device or at an edge of the display device, it is able for the display device to adjust the position of the light-shielding pattern, thereby to achieve the 3D display effect.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A liquid crystal grating, comprising a first substrate, a second substrate arranged opposite to the first substrate, and a liquid crystal layer arranged between the first substrate and the second substrate, wherein the liquid crystal grating further comprises a first electrode arranged on the first substrate and a second electrode arranged on the second substrate;

liquid crystals in the liquid crystal layer are capable of being deflected under the effect of an electric field generated between the first electrode and the second electrode;

the first electrode comprises at least two sub-electrode layers insulated from each other;

each sub-electrode layer comprises a plurality of sub-electrodes spaced apart from, and arranged parallel to, each other;

the sub-electrodes at different layers extend in an identical direction; and a gap between every two adjacent sub-electrodes at one of the sub-electrode layers is capable of being covered by projections of the sub-electrodes at the other sub-electrode layers onto the one sub-electrode layer, each sub-electrode layer further comprises a protection layer, the protection layer covers the plurality of sub-electrodes and fills up a gap between any two adjacent sub-electrodes, wherein the first electrode comprises a first sub-electrode layer and a second sub-electrode layer;

the first sub-electrode layer comprises a plurality of first sub-electrodes spaced apart from, and arranged parallel to, each other;

the second sub-electrode layer comprises a plurality of second sub-electrodes spaced apart from, and arranged parallel to, each other; and a projection of each second sub-electrode onto the first sub-electrode layer covers a gap between two adjacent first sub-electrodes, wherein the first sub-electrodes of the first sub-electrode layer and the second sub-electrodes of the second sub-electrode layer form a plurality of light-shielding patterns spaced apart from each other, and the light-shielding patterns meet the following conditions:

a=n*x and b=n*y, where n is an integer greater than 1, a represents a width of each light-shielding pattern, b represents an interval between any two adjacent light-shielding patterns, x represents a width of the first sub-electrode, and y represents a gap between any two adjacent first sub-electrodes, wherein x is an integral multiple of y, or y is an integral multiple of x, wherein each second sub-electrode meets the following condition: a=m*z and b=m*r, where z represents a width of each second sub-electrode, r represents a gap between any two adjacent second sub-electrodes, m is an integer greater than 1, and z is greater than or equal to y.

2. The liquid crystal grating according to claim 1, wherein any two adjacent first sub-electrodes are spaced apart from each other at an identical interval, and any two adjacent second sub-electrodes are spaced apart from each other at an identical interval.

3. The liquid crystal grating according to claim 1, wherein x is equal to y.

4. The liquid crystal grating according to claim 1, wherein z is an integral multiple of r, or r is an integral multiple of z.

5. The liquid crystal grating according to claim 4, wherein z is equal to r.

6. A display device, comprising the liquid crystal grating according to claim 1.

7. The display device according to claim 6, wherein any two adjacent first sub-electrodes are spaced apart from each other at an identical interval, and any two adjacent second sub-electrodes are spaced apart from each other at an identical interval.

8. The display device according to claim 6, wherein x is equal to y.

9. The display device according to claim 6, wherein each second sub-electrode meets the following condition: a=m*z and b=m*r, where z represents a width of each second sub-electrode, r represents a gap between any two adjacent second sub-electrodes, m is an integer greater than 1, and z is greater than or equal to y.

10. The display device according to claim 9, wherein z is an integral multiple of r, or r is an integral multiple of z.

11. The display device according to claim 10, wherein z is equal to r.

12. A display method for a display device, wherein the display device comprises a liquid crystal grating, the liquid crystal grating comprises a first substrate, a second substrate arranged opposite to the first substrate, a liquid crystal layer arranged between the first substrate and the second substrate, a first electrode arranged on the first substrate and a second electrode arranged on the second substrate; the first electrode comprises at least two sub-electrode layers insulated from each other;

wherein the method comprises:

acquiring a position of a user;

calculating a position of a light-shielding pattern of a liquid crystal grating in accordance with the position of the user;

determining a sub-electrode of a first electrode to be energized in accordance with the position of the light-shielding pattern of the liquid crystal grating; and energizing the sub-electrode of the first electrode, wherein during the operation of the liquid crystal grating, a first electrode block consisting of consecutively adjacent k1 first sub-electrodes of a first sub-electrode layer and corresponding to the position of the light-shielding pattern of the liquid crystal grating is energized, k1*x+k1*y=a, a second electrode block consisting of consecutively adjacent k2 second sub-electrodes of a second sub-electrode layer and corresponding to the position of the light-shielding pattern of the liquid crystal grating is energized, and k2*z+k2*r=a;

in the case that the second electrode block is energized, a projection of a first one of the second sub-electrodes of the second electrode block which is energized covers a air between a first one and a second one of the first sub-electrodes of the first electrode block which are energized; and consecutive f1 first sub-electrodes corresponding to a position outside the light-shielding pattern are not energized, f1*x+f1*y=b, consecutive f2 second sub-electrodes corresponding to a position outside the light-shielding pattern are not energized, and f2*z+f2*r=b, wherein k1, k2, f1 and f2 are each an integer greater than 1, a represents a width of each light-shielding pattern, and b represents an interval between any two and adjacent light-shielding patterns; x represents a width of the first sub-electrode, and y represents a gap between any two adjacent first sub-electrodes; z represents a width of each second sub-electrode, r represents a gap between any two adjacent second sub-electrodes.

* * * * *